(12) United States Patent
Morioka

(10) Patent No.: US 10,324,162 B2
(45) Date of Patent: Jun. 18, 2019

(54) DETERMINING THE GEOGRAPHIC LOCATION OF A MOBILE COMMUNICATIONS DEVICE USING A POSITIONING REFERENCE SIGNAL

(71) Applicant: SONY CORPORATION, Tokyo (JP)

(72) Inventor: Yuichi Morioka, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 40 days.

(21) Appl. No.: 15/547,526

(22) PCT Filed: Jan. 26, 2016

(86) PCT No.: PCT/EP2016/051598
§ 371 (c)(1),
(2) Date: Jul. 31, 2017

(87) PCT Pub. No.: WO2016/131613
PCT Pub. Date: Aug. 25, 2016

(65) Prior Publication Data
US 2018/0017661 A1 Jan. 18, 2018

(30) Foreign Application Priority Data
Feb. 18, 2015 (EP) ..................................... 15155651

(51) Int. Cl.
*G01S 5/08* (2006.01)
*G01S 5/02* (2010.01)
(Continued)

(52) U.S. Cl.
CPC ................ *G01S 5/08* (2013.01); *G01S 3/043* (2013.01); *G01S 5/0221* (2013.01); *G01S 5/0236* (2013.01); *H04W 4/02* (2013.01)

(58) Field of Classification Search
CPC .......... G01S 5/08; G01S 3/043; G01S 5/0221; G01S 5/0236; H04W 4/02
See application file for complete search history.

(56) References Cited

U.S. PATENT DOCUMENTS

| | | | |
|---|---|---|---|
| 8,374,624 B2* | 2/2013 | Baik | G01S 5/0294 342/357.32 |
| 2006/0028377 A1* | 2/2006 | Abraham | G01S 5/0036 342/357.68 |

(Continued)

FOREIGN PATENT DOCUMENTS

WO  2011/146011 A1  11/2011

OTHER PUBLICATIONS

Harris Holma, et al., "LTE for UMTS: OFDMA and SG-FDMA Based Radio Access," Wiley 2009, ISBN 978-0-470-99401-6, (4 pages).

(Continued)

*Primary Examiner* — Marisol Figueroa
(74) *Attorney, Agent, or Firm* — Xsensus LLP

(57) ABSTRACT

A communications device includes: a receiver configured to receive signals including at least one positioning reference signal transmitted in each of a plurality of time units; at least one antenna connected to the receiver; a motion detector configured to determine a relative local position of the communications device; and a controller configured to generate a measurement data set including plural measurement samples of at least a phase of the positioning reference signal according to a sampling rate, and a location of the communications device at which the phase of the positioning reference signal was determined. The controller is configured to estimate a relative angle of arrival of the received radio signals, used to determine an estimation of a location of the communications device, wherein the controller is configured to adapt at the rate of sampling to generate the measurement data set in accordance with predetermined conditions.

16 Claims, 11 Drawing Sheets

(51) Int. Cl.
*H04W 4/02* (2018.01)
*G01S 3/04* (2006.01)

(56) References Cited

U.S. PATENT DOCUMENTS

| | | | |
|---|---|---|---|
| 2011/0070840 A1* | 3/2011 | Nielsen | H04B 7/028 |
| | | | 455/67.11 |
| 2011/0171977 A1* | 7/2011 | Putkiranta | H04M 15/00 |
| | | | 455/456.3 |
| 2013/0113660 A1 | 5/2013 | Tufvesson et al. | |
| 2013/0229303 A1 | 9/2013 | Marshall | |

OTHER PUBLICATIONS

Swarun Kumar, et al., "Accurate Indoor Localization with Zero Start-up Cost," Mobile Computing and Networking, XP058055518, Sep. 7, 2014, pp. 483-494.
International Search Report dated May 3, 2016 in PCT/EP2016/051598 filed Jan. 26, 2016.

* cited by examiner

Higher Positioning Accuracy with Longer Measurement Interval

Accurate Gyroscope (left) vs. Mediocre Gyroscope (right)

Positioning Reference Signal Insertion

DETERMINING THE GEOGRAPHIC LOCATION OF A MOBILE COMMUNICATIONS DEVICE USING A POSITIONING REFERENCE SIGNAL

CROSS-REFERENCE TO RELATED APPLICATIONS

The present application is based on PCT filing PCT/EP2016/051598 filed Jan. 26, 2016, and claims priority to European Patent Application 15155651.1, filed in the European Patent Office on Feb. 18, 2015, the entire contents of each of which being incorporated herein by reference.

BACKGROUND

Field of Disclosure

The present disclosure relates to communications devices, which are configured to determine their location based on detecting a direction of arrival of signals received from the infrastructure equipment. The present technique also relates to infrastructure equipment and methods of communicating.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

It is well known in the field of wireless telecommunications, modern mobile communications devices can typically include a Global Positioning System (GPS) receiver, which is configured to receive signals from GPS satellites, which can be used to detect a location of the communications device. However, the signals transmitted by the GPS satellites cannot penetrate buildings and so in some situations a communications device may not be able to generate an indication of its location even if a GPS receiver is available.

It is known for example from WO2011/146011 to determine a direction of arrival of signals received from a base station of a mobile communications network, using positioning reference signals received from the base station. Using the direction of arrival, and a location of the base station it is possible to generate a location of a communications device which receives the signals from the base station.

SUMMARY OF THE DISCLOSURE

According to one example embodiment of the present technique, a communications device is configured to transmit signals to and/or receive signals from an infrastructure equipment of a mobile communications network. The communications device comprises a receiver configured to receive signals transmitted by an infrastructure equipment of a mobile communications network, the signals being transmitted in accordance with a wireless access interface and including at least one positioning reference signal transmitted in each of a plurality of time units. The communications device includes at least one antenna connected to the receiver, a motion detector configured to determine a relative local position of the communications device, and a controller configured to generate a measurement data set comprising a plurality of measurement samples of at least a phase of the positioning reference signal according to a sampling rate, and a location of the communications device at which the phase of the positioning reference signal was determined. The controller is configured to estimate a relative angle of arrival of the received radio signals, which include the positioning reference signal, by interpreting the measurement data set as a synthetic antenna array, to determine an estimation of a location of the communications device using the estimate angle of arrival, wherein the controller is configured to adapt at the rate of sampling to generate the measurement data set in accordance with predetermined conditions.

Embodiments of the present technique can provide an arrangement in which a rate of sampling of a positioning reference signal received from an infrastructure equipment of a mobile communications network can be adapted in accordance with the predetermined conditions such as a relative speed of the communications device so that a more accurate estimate of the direction of arrival of the received signals from the infrastructure equipment can be determined. Using the direction of arrival, and a location of the infrastructure equipment which transmitted the signals, a location of the communications device can be determined, when, for example, a GPS device cannot be used or is not available.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Conventional Communications System

Figure 1:
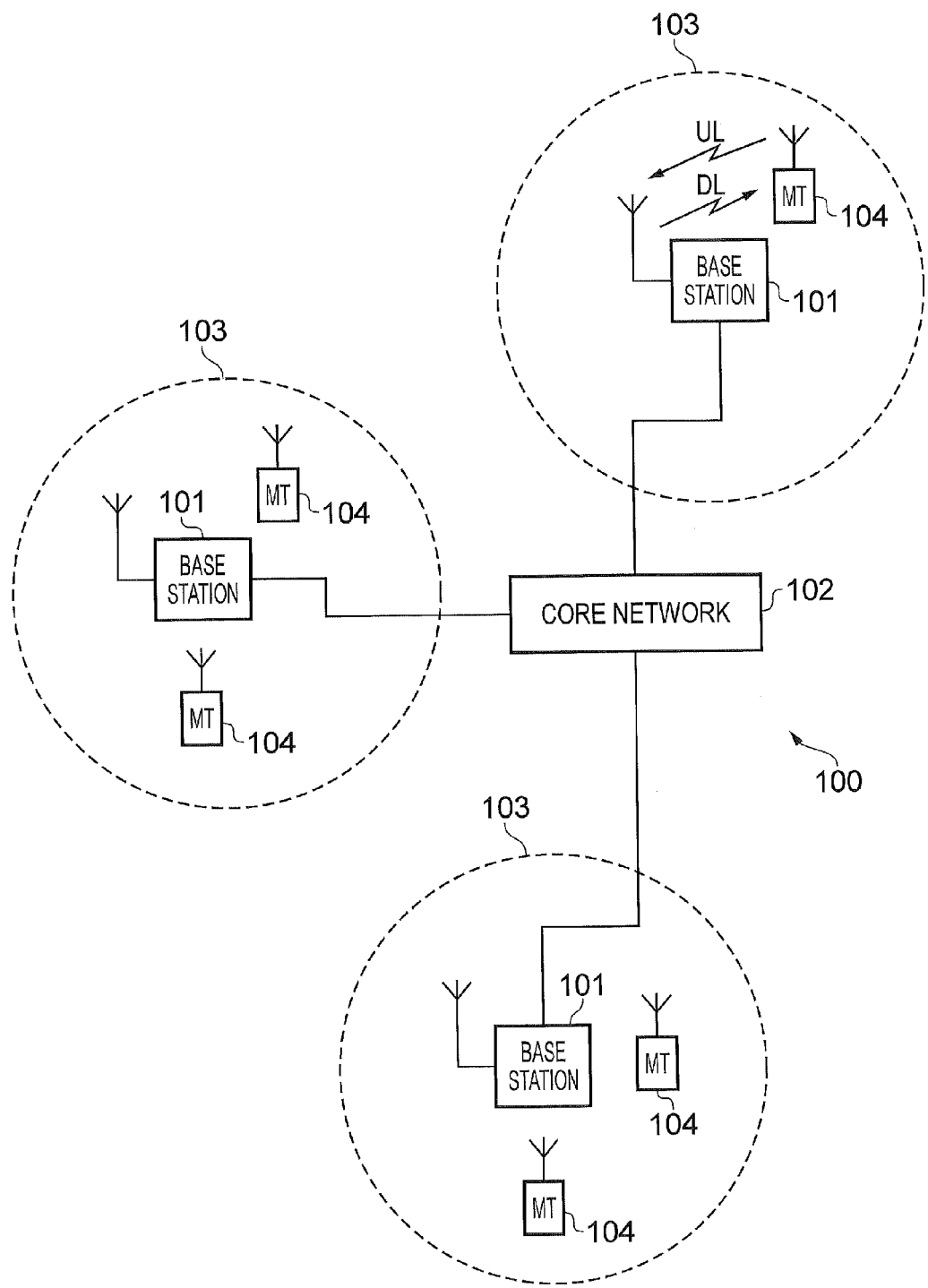
FIG. 1 is a schematic block diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/NodeBs/eNodeBs, and so forth.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2:
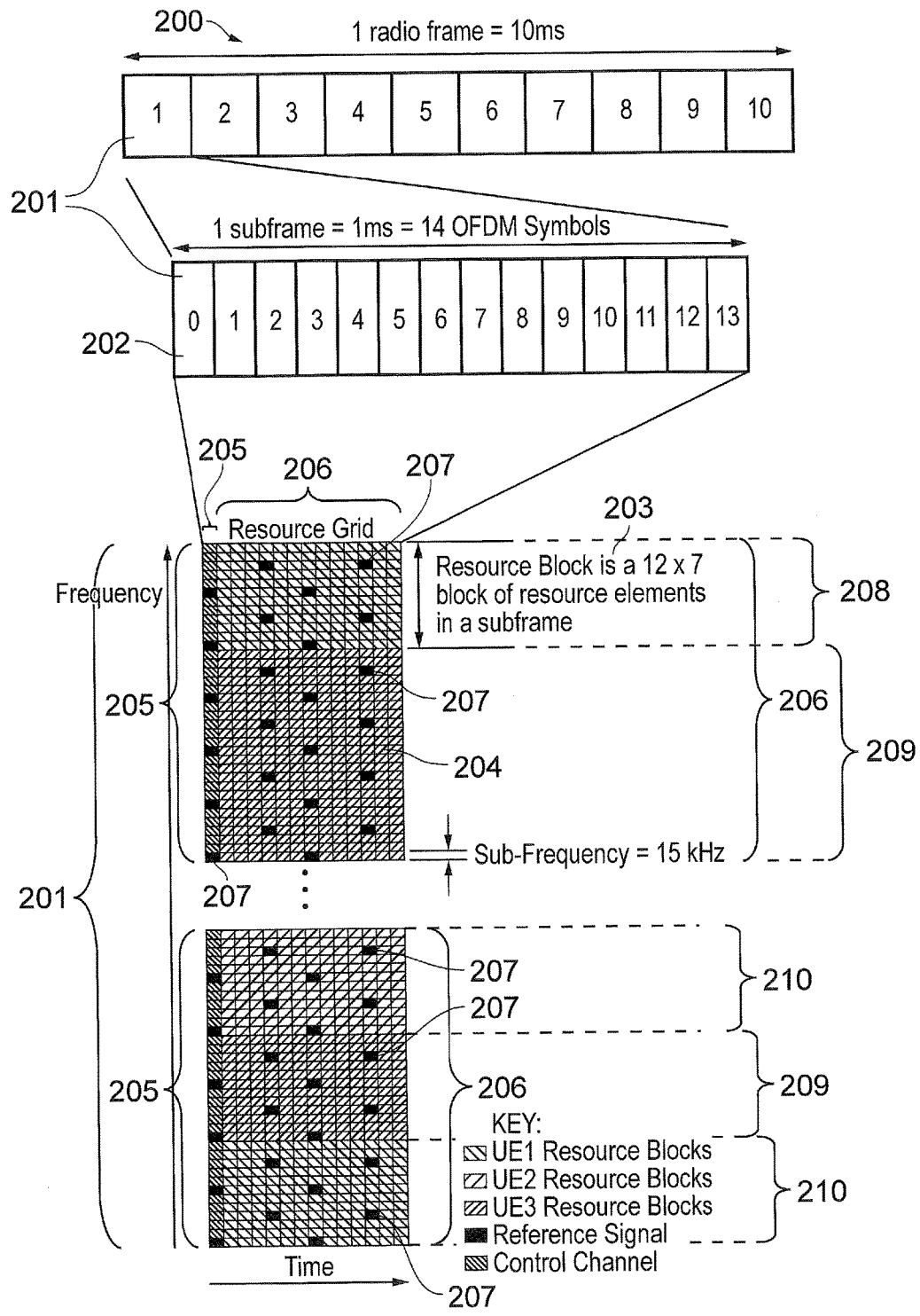
FIG. 2 is a schematic representation illustrating a frame structure of a down-link of a wireless access interface according to an LTE standard.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1.

Figure 3:
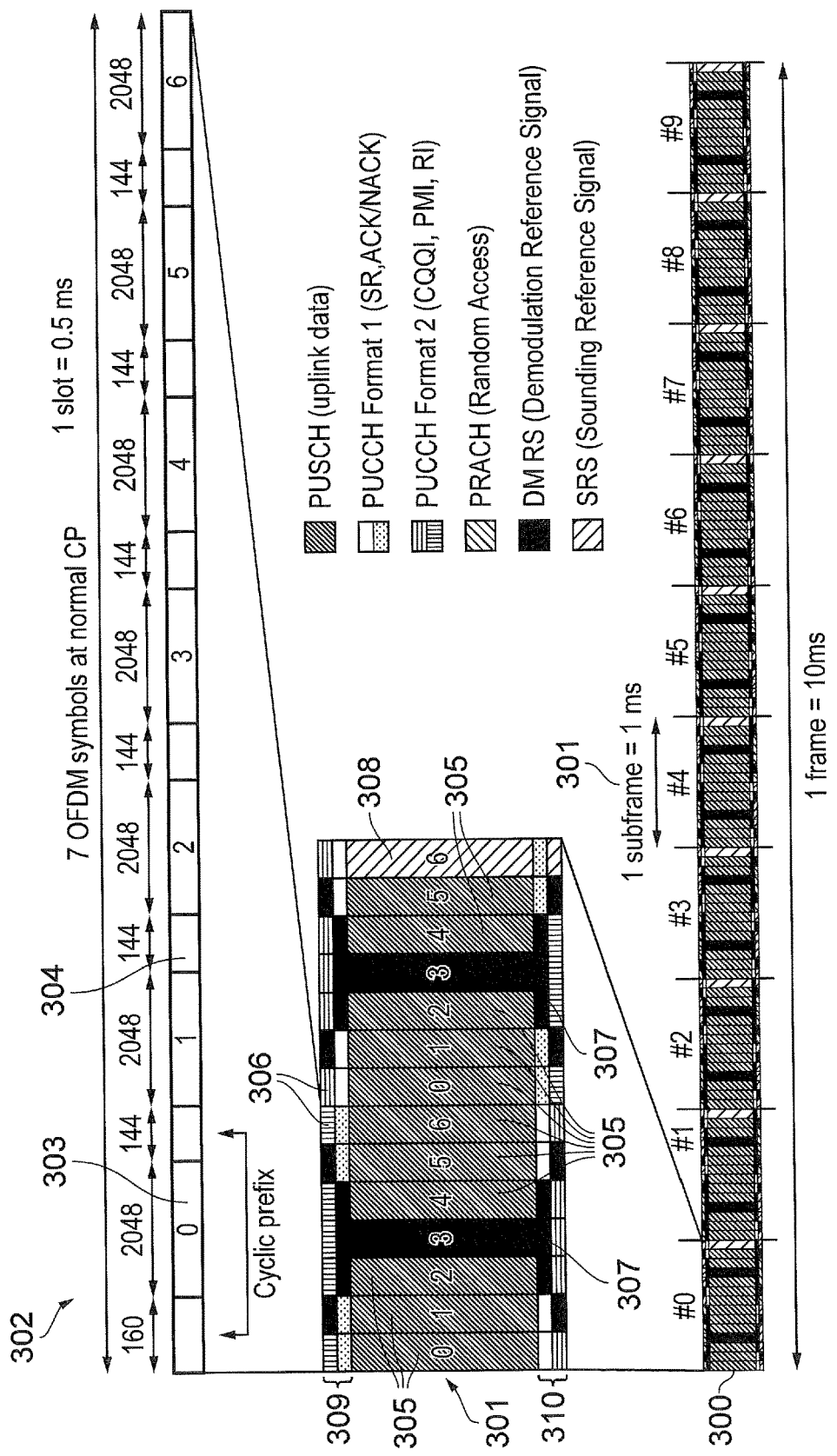
FIG. 3 is a schematic representation illustrating a frame structure of an up-link of wireless access interface according to an LTE standard.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration.

Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes. More details of the LTE up-link represented in FIG. 3 are provided in Annex 1.

Location Identification Using a Synthetic Antenna Array

Embodiments of the present technique can provide an arrangement in which a mobile communications device or UE can operate to communicate in a mobile communications system via a base station, which can be arranged to identify an angle of arrival of signals received from the base station from measurements of those received signals at a plurality of locations. The angle of arrival relative to the communications device of signals received from the eNB, can be used with knowledge of the location of the eNB to assist in identifying the location of the UE in combination with other measurements such as motion of the UE and/or the angle arrival of signals from another base station.

Embodiments of the present technique therefore provide an arrangement in which the eNB instructs the communications device or UE to perform measurement of the received signals or to transmit received signals for which measurements are taken in accordance with predetermined conditions of the communications device or UE such as a speed of the UE or a relative performance of the motion detector.

Figure 4:
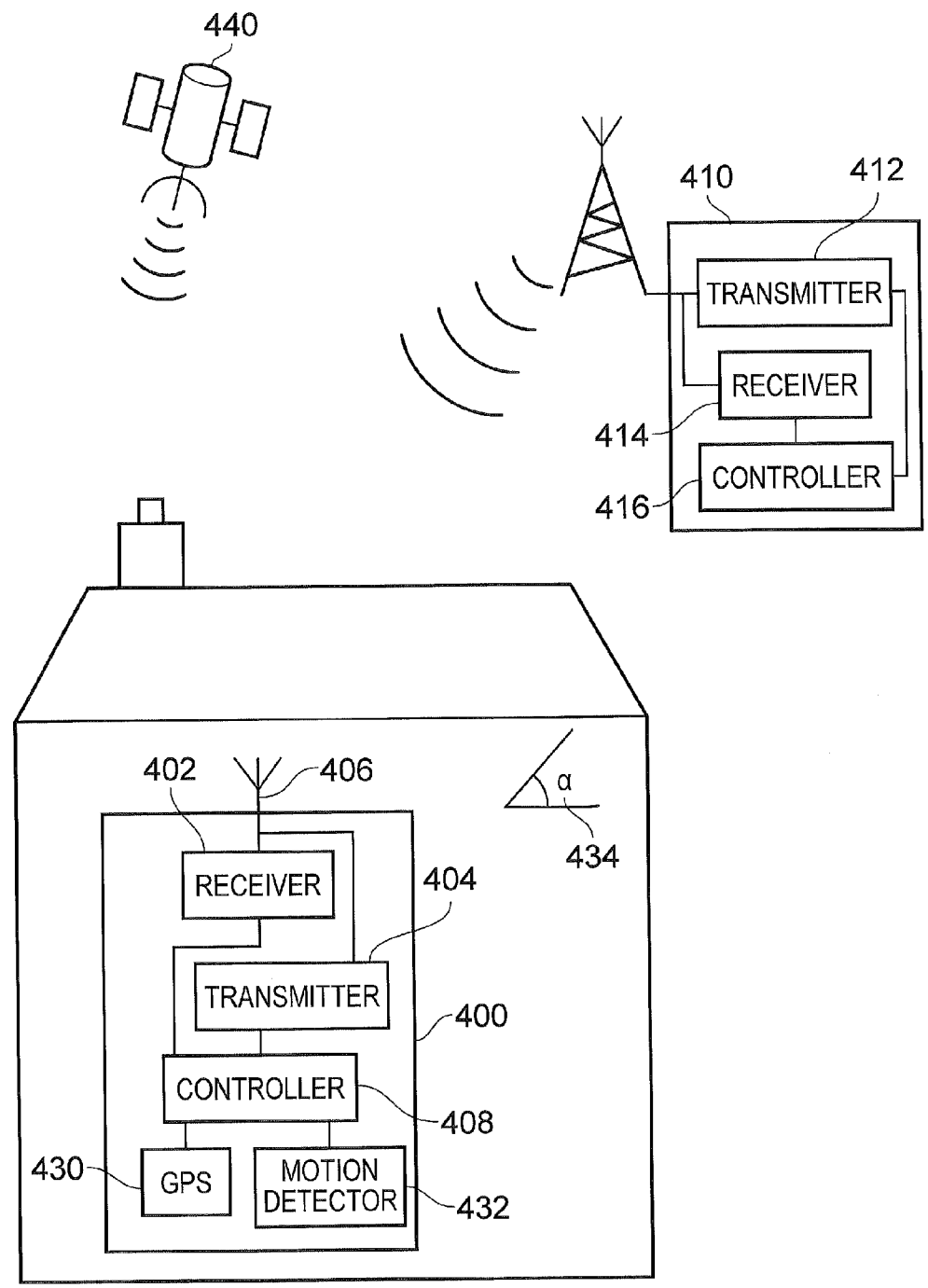
FIG. 4 is a schematic block diagram of a communications device operating to transmit signals to an infrastructure equipment and to receive signals from an infrastructure equipment and in which the communications device is disposed in a house.

An example arrangement which illustrates example embodiments of the present technique is showing in FIG. 4. In FIG. 4, a UE 400 in accordance with the present technique comprises a receiver 402 and a transmitter 404, which receives signals detected by an antenna 408. The UE 400 is configured to transmit and receive signals using the receiver 402 and transmitter (404) under the control of a controller 408. The signals for example are transmitted in accordance with the LTE wireless access interface explained above with reference to FIGS. 2 and 3 which are transmitted to and received from a base station eNB 410. The eNB conventionally comprises a transmitter 412, a receiver 414 which are controlled by a controller 416 which may include a scheduler which controls access to the communications resources of the wireless access interface as explained above with reference to the LTE Standard. However, it will be appreciated that the general principles of the present technique can be applied to any wireless access interface and is not limited to LTE.

As shown in FIG. 4 the UE 400 also includes a GPS receiver 430 as well as the motion detector 432. The GPS processor 430 receives signals from the receiver antenna 402 via the receiver 406 and generates a position of the UE 400 providing co-ordinates identifying its location on the surface of the earth. This is achieved by receiving signals from one or more satellites 440. However, in some examples such as where the UE 400 is disposed inside a building, the signals transmitted by the satellite, for example GPS signals, may not be receivable by the antenna 406 in combination with the receiver 402 and so the GPS processor 430 may not be able to provide an identification representing the location of the UE 400. According to this example scenario, therefore the location of the UE 400 may be determined by identifying an angle of arrival of the signals from the base station 410 in combination with one or more other measurements. This is achieved, as mentioned above, by arranging for a plurality of measurement data samples of known signals within the LTE downlink transmissions from eNB 410 from which a synthetic array can be formed. Using the synthetic array an angle arrival of the signals from the eNB 410 can be determined which is represented in FIG. 4 as an angle $\alpha$ 434.

It is known to those skilled in the art to provide an arrangement in which a single antenna can be used to determine an angle of arrival of signals from a source, from which a location of a UE can be estimated. Such an arrangement is disclosed in WO2011/146011 [2], the content of which is incorporated herein by reference.

An arrangement for generating and measuring an angle of arrival $\alpha$ of radio signals transmitted by a base station is disclosed in prior art document WO 2011/146011 [2] by forming a synthetic array. This technique disclosed in WO 2011/146011 will now briefly be explained with reference to FIG. 5. In accordance with this arrangement the UE is able to detect the angle of arrival $\alpha$ of the signals from the base station 410 and in combination with additional input as well as the geographical location of the base station 410 to determine its own geographical location, for example, on a global co-ordinates system XYZ.

Figure 5:
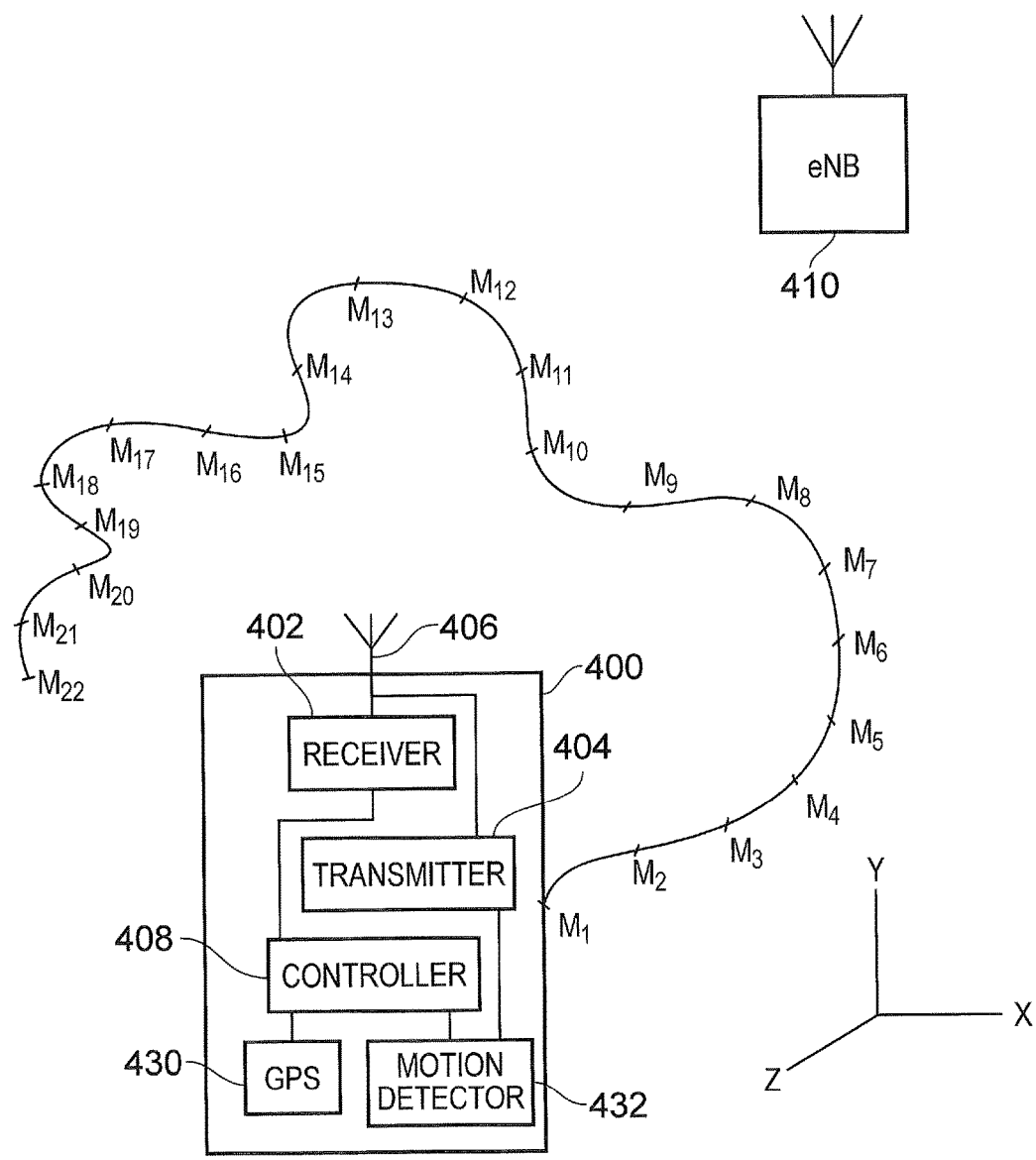
FIG. 5 is a schematic representation of a process in which a set of measurements are taken of received positioning reference signals to form a data set, from which a synthetic antenna array can be formed.

As shown in FIG. 5, the UE 400 is configured to estimate the direction to the eNB 410 based on a data set which is obtained by receiving and sampling a positioning reference signal (PRS) at different time points while the UE 410 is moved along a three dimensional trajectory 510. The sampling thus results in a set of spatial measurement points m1-m22 as shown in FIG. 5, although it will be appreciated that the number of measurement points could be a number established within any predetermined measurement period. The set of spatial measurement points m1-m22 will be referred to generally as a measurement data set. Each measurement point of the measurement data set can represent one or more properties of the received PRS, including at least the phase of the PRS, and possibly the amplitude of the signal, as sampled at the respective time point. Typically, as the PRS is being sampled, motion data is generated by the motion detector 408, which represents a relative speed of the UE whilst the measurement data set is being generated.

The motion positional data may indicate an relative or absolute location of the UE 400 in a local coordinate system, or the corresponding location of the antenna 108 (i.e. accounting not only for translation but also rotation of the UE 400), for each measurement point $m_1$-$m_{22}$. The local coordinate system is defined in relation to the UE 400 and has no predefined relation to the global coordinate system XYZ with respect to which the UE 400 or the eNB 410 is to determine is location of the UE.

As explained in [2] by associating each measurement point $m_1$-$m_{22}$ with a local position, it is possible to treat the resulting measurement data set as a synthetic/virtual antenna array. That is to say that the relative motion or position data is combined with the measurement data set to form a combined data set providing for each point in the measurement data set (phase of the PRS) a relative location of that sample point in space so that the measurement data set then can be interpreted as if generated using a multi-antenna array. Each point in the data set represents an antenna in the synthetic antenna array. There are various known directional estimation algorithms disclosed in [2] which can then be applied to the combined measurement data set to estimate the direction of arrival of the PRS received from the eNB, some of which are referred to in [2]. Such directional estimation algorithms, commonly denoted DOA (direction of arrival) algorithms, to enable directional estimation based on a data set of signal properties sampled at a sufficient number of spatially separated positions with sufficiently well-defined coordinates. Those samples can be measured either by a synthetic/virtual array or a physical array. Common to such DOA algorithms is that they define a function that relates the phase of the signal, and possibly the amplitude of the signal, at different positions to the direction of arrival of the signal at the antenna array.

The measurement data set gathered from the virtual antenna can be referred to an "array response", which is a well-known term to the person skilled in the art, which refers to a M×1 complex array response of the synthetic antenna array built up from the different measurement positions to a (unit power) source in the direction (e, q;), where e, q; are the elevation and azimuth angles-of-arrival, respectively, from the source and M is the number of measurement points. The array response can be decomposed to form an element beam pattern shared by the antenna element in all its positions (measurement points) and a phase vector relating the positions (measurement points) within the synthetic antenna array to the phases of the array response. With this antenna array response, considering the measured phase changes during the movement, it is possible to determine the direction to the source. In one example, if there are enough sources available and that the locations of those sources are known, it is possible to determine the location (global position) of the receiving antenna. Such an arrangement is illustrated in FIG. 6.

Figure 6:
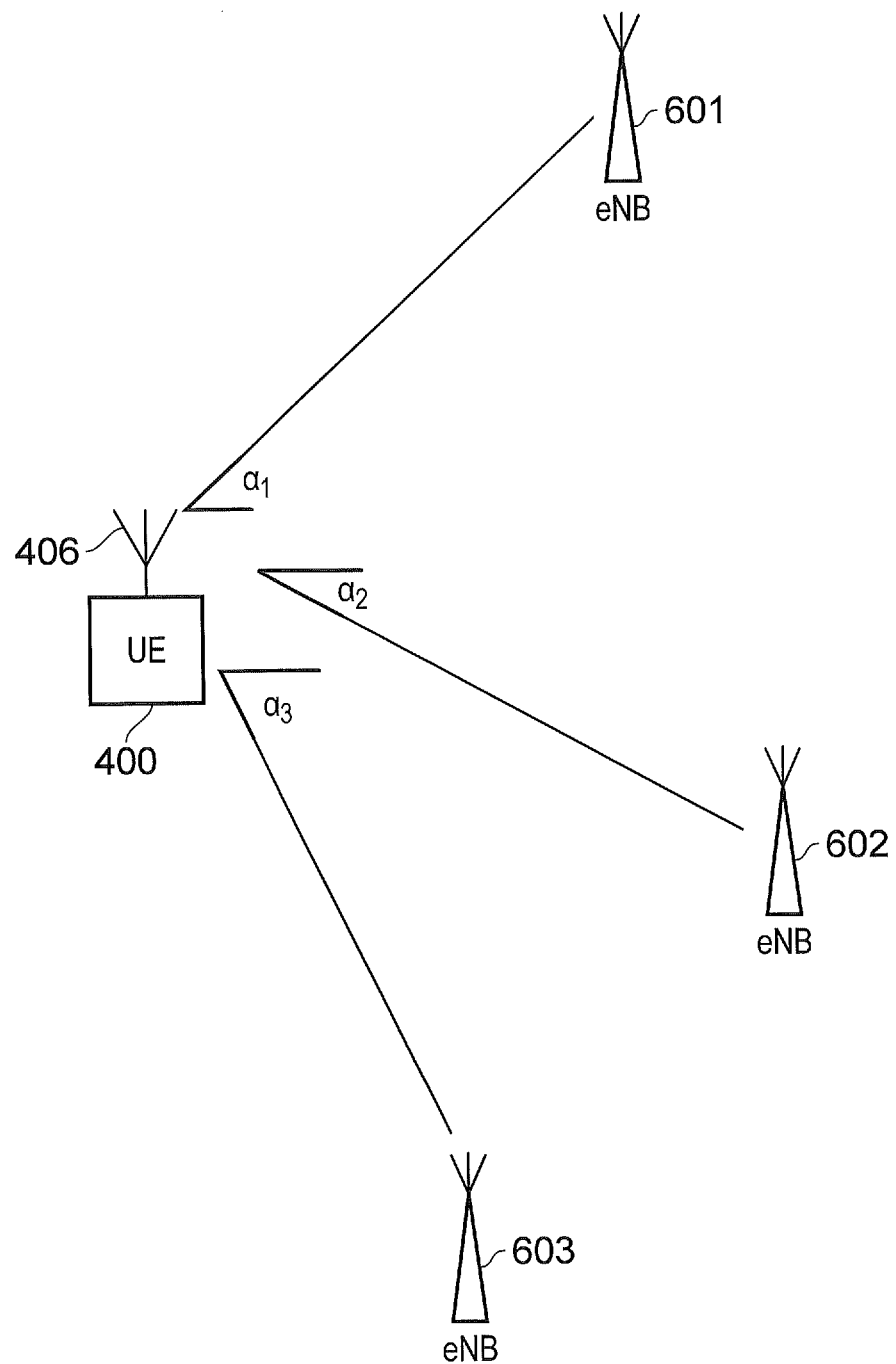
FIG. 6 is a schematic representation of a process in which a communications device can determine its location by triangulating a plurality of directions of arrival of received signals from a plurality of base stations.

An alternative arrangement in which the UE is able to identify its location is for example by triangulating signals from a plurality of other base stations as shown in FIG. 6. In FIG. 6 the UE performs the technique described above and generates an estimate of the location of the UE 400. Thus as shown in FIG. 6 the UE 400 applies the above method to determine the arrival of signals from each of the respective base stations 601, 602, 603 which are shown to be α1, α2, α3 and then performs a triangulation of the respective bearings from the UE 400 to the base station 601, 602, 603 so that the UE can identify its location based on an intersection of respective bearings in accordance with a known arrangement.

For the example shown in FIG. 6, that the phase is indicative of the directions to the sources and that this technique does not depend on the time for the signal to travel from the source to the 10 receiver. The technique thereby works for arbitrary signals s(ti) from the source. For multipath channels, which are predominant for wireless communication, it should be noted that there is one phase and amplitude term associated with each multipath component and it is the incoming angle of the multi path component that is estimated. Since the resulting data set may be treated/processed as a synthetic/virtual antenna array, the UE 400 may be provided with a simple and space-efficient antenna 406, which does not enable directional estimation in itself, since the resulting data set is treated/processed as a synthetic/virtual antenna array as described above.

Adapting Location Estimation for Mobile Communications Network

Example embodiments of the present technique will now be described with reference to FIGS. 7 to 14. As explained above, respective example aspects and features of the present technique are arranged to provide a location identification technique for UE's operating within a mobile radio network. In accordance with this technique, a relative rate of generating the measurement data in order to determine an angle arrival of signals from a base station is adapted in accordance with predetermined conditions. In one example, the predetermined condition is the relative rate of movement of the UE or speed of the UE, whereas another example is the relative accuracy of the other measurement apparatus such as the motion detector. These embodiments will now be explained.

Figure 7:
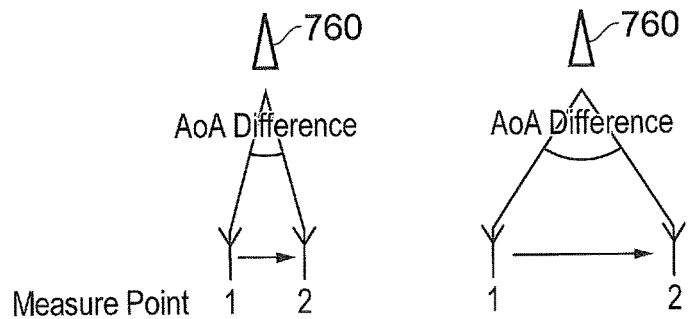
FIG. 7 is an illustration of a difference between a positional accuracy for a direction of arrival of signals depending upon a rate of sampling positioning reference signals from a base station.

As will be appreciated from the above explanation, the technique for forming a synthetic array is based on taking measurement values of a reference signal (PRS) which is transmitted from a base station. In one example, the reference signal could be a predetermined signal transmitted in the same resource block of each of the frames of an LTE wireless access interface. In another example the UEs can utilise the reference signals 207 shown in FIG. 2 which are transmitted as part of the downlink of the wireless access interface. However, essentially, in order to derive these measurements and more specifically the displacement between these measurements, it is necessary to determine a phase difference of the received signal. However, the phase difference will depend on the wavelength of the transmitted signal. For example, for a transmission wave length of 700 MHz then the relative wavelength is 40 cm and therefore measurement should be made within the distance of 40 cms in order to identify a difference in the phase of the PRS to avoid a phase ambiguity (within 360 degrees). However if the measurement is done at a 1 cm interval it may be hard to observe a difference in an angle of arrival of these signals and therefore the DOA detection algorithm will be less accurate. This arrangement is illustrated in FIG. 7 in which respective measurement points 1 and 2 of an antenna of the UE 400 is shown with respect to the transmitting base station 410. As shown, the greater the distance between the measurements, the greater the difference in the angle of arrival and therefore the greater an accuracy with which the angle arrival of the signals at the current position of the UE will be able to be measured. However, in order to maximise a distant between measurements, it is necessary to estimate the speed of movement of the UE and therefore the relative rate at which the measurement data should be generated. Therefore, in accordance with the present technique the UE 400 is directed by the base station 410 to determine each measurement sample after a time determined with respect to the speed of the UE. To this end, according to the example embodiments of the present technique the UE reports its relative speed to the base station which then determines, based on the available transmissions of the reference signals (PRS), the relative rate in which it should be generating the measurements.

Another point to consider is the relative accuracy of the motion detector. The motion detection can be for example generated by a gyroscope. However the quality of the gyroscope will reflect the accuracy of the measurement. A more cost efficient solution can be provided by a lower accuracy motion detector. However this will require a greater number of measurements of the relative angle of arrival to generate the synthetic array. Accordingly, the UE may report its accuracy level and the eNB may decide to instruct the measurements to be conducted at shorter time intervals for more accurate motion detectors.

Figure 8:
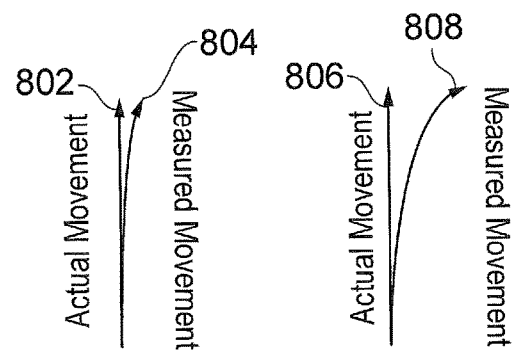
FIG. 8 is a graphical illustration of a difference in a measurement accuracy produced by a first motion detector and a less accurate second motion detector.

FIG. 8 provides an example illustration of accuracy of the gyroscope with respect to measured movement for a first example on the left hand side for a more expensive gyroscope and therefore more accurate gyroscope and the right hand side a less accurate gyroscope and therefore a lower cost gyroscope. Accordingly, a first arrow 802 in FIG. 8 shows the actual movement of a UE and the second arrow 804 shows the measured movement according to the more accurate gyroscope. The second example provides a third arrow representing the actual movement 806 and the fourth arrow 808 represents the measured movement which differs more greatly than the measurement arrow 804. Accordingly, as will be appreciated, in accordance with the relative quality of the motion detector, the eNB can instruct the UE to increase a rate in which measurement data is gathered for the angle arrival of the signals from the eNB.

Figure 9:
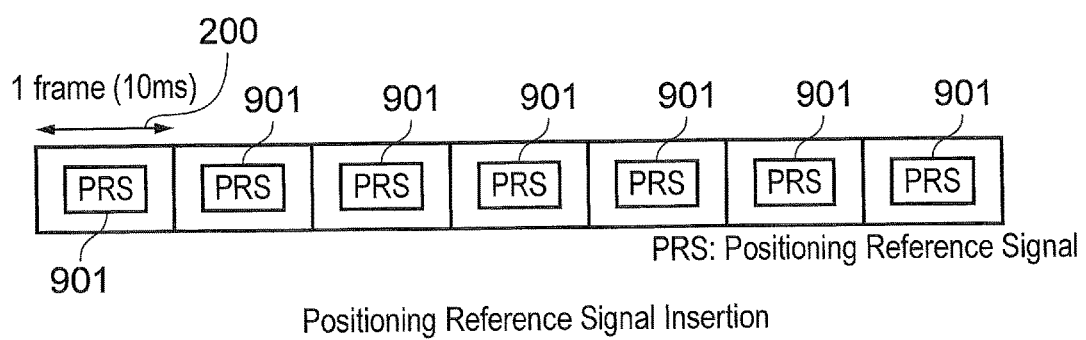
FIG. 9 is a schematic block diagram representing an illustration of positioning reference signals which are transmitted in each of a plurality of frames of a down-link LTE wireless access interface, such as that shown for example in FIG. 2.
Figure 10:
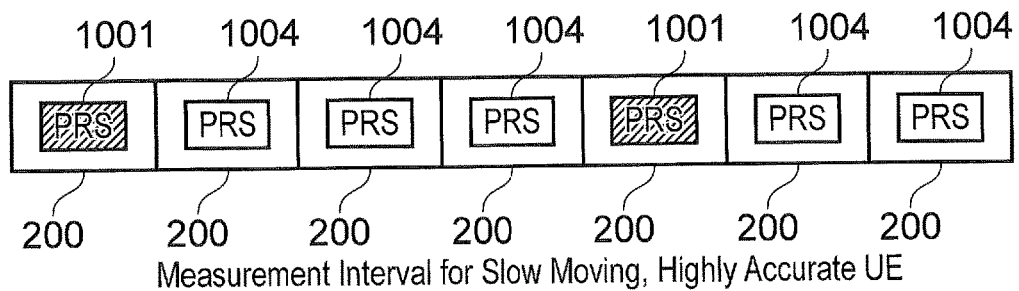
FIG. 10 is a schematic block diagram representing the illustration of positioning reference signals shown in FIG. 9, which are sampled at a rate which has been selected for a slow moving communications device with a motion detector with a relatively high accuracy.
Figure 11:
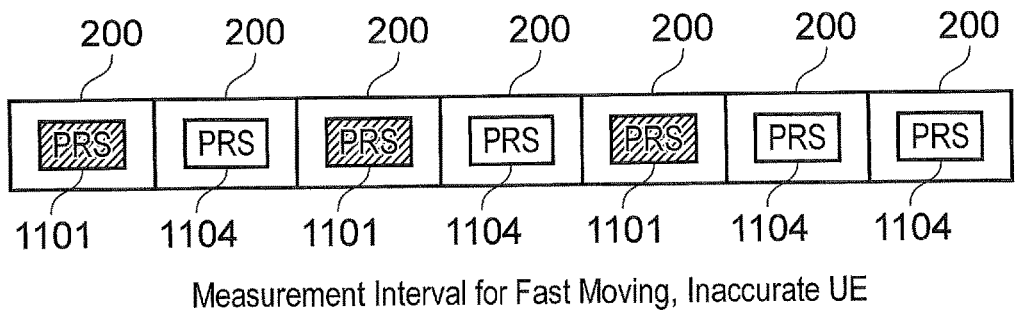
FIG. 11 is a schematic block diagram representing the illustration of positioning reference signals shown in FIG. 9, which are sampled at a rate which has been selected for a fast moving communications device with a motion detector with a relatively low accuracy.

FIGS. 9, 10 and 11 provide a schematic illustration of an arrangement in which a UE is instructed to generate measurement data of received positioning reference signals in response to an instruction from an eNB. In FIG. 9, the positioning the reference signals (PRS) 901 are shown which are transmitted in each frame 200 of a downlink wireless access interface as represented by FIG. 2. As mentioned above in some examples the PRS are inserted in resource blocks of the PDSCH following an indication of their location which is transmitted in a control channel, which is the PDCCH, by the eNB. However, in other examples, the reference signals 207 which are transmitted within the downlink wireless access interface, can be used by the UE 400 as PRS. In some examples the PRS may be selectively identified by the eNB 410 to the UE 400 as reference signals which are to be used as PRS according to a broadcast signal or specifically signalled on a control channel, such as the PDCCH that a resource block in the PDSCH contains a positioning reference signal.

FIG. 10 provides an example illustration of an arrangement in which the UE has been instructed by the eNB to use only one in four positioning reference signals that generate the measurement data for the synthetic array. Accordingly, FIG. 10 represents an example of a slow moving but highly accurate positioning motion detector arrangement, so that only the shaded PRS 1001 are used to generate measurement sample data points for the synthetic array and the remaining PRS 1004 are not used. In contrast FIG. 11 shows an example in which the UE reports its speed as relatively high but using an inaccurate motion detector. Accordingly, for the example shown in FIG. 11, the shading PRS 1101, which is every other frame 200, are used and the remaining PRS 1104 are not used to generate measurement data points for the synthetic array.

As will be appreciated therefore by the example illustrations in FIGS. 9, 10 and 11, an arrangement is provided in which the eNB can control the rate of measuring a PRS transmitted by the eNB to control the rate in which measurement data for the synthetic array is generated in accordance with predetermined conditions such as the speed of the UE or a relative accuracy of the motion detector.

Figure 12:
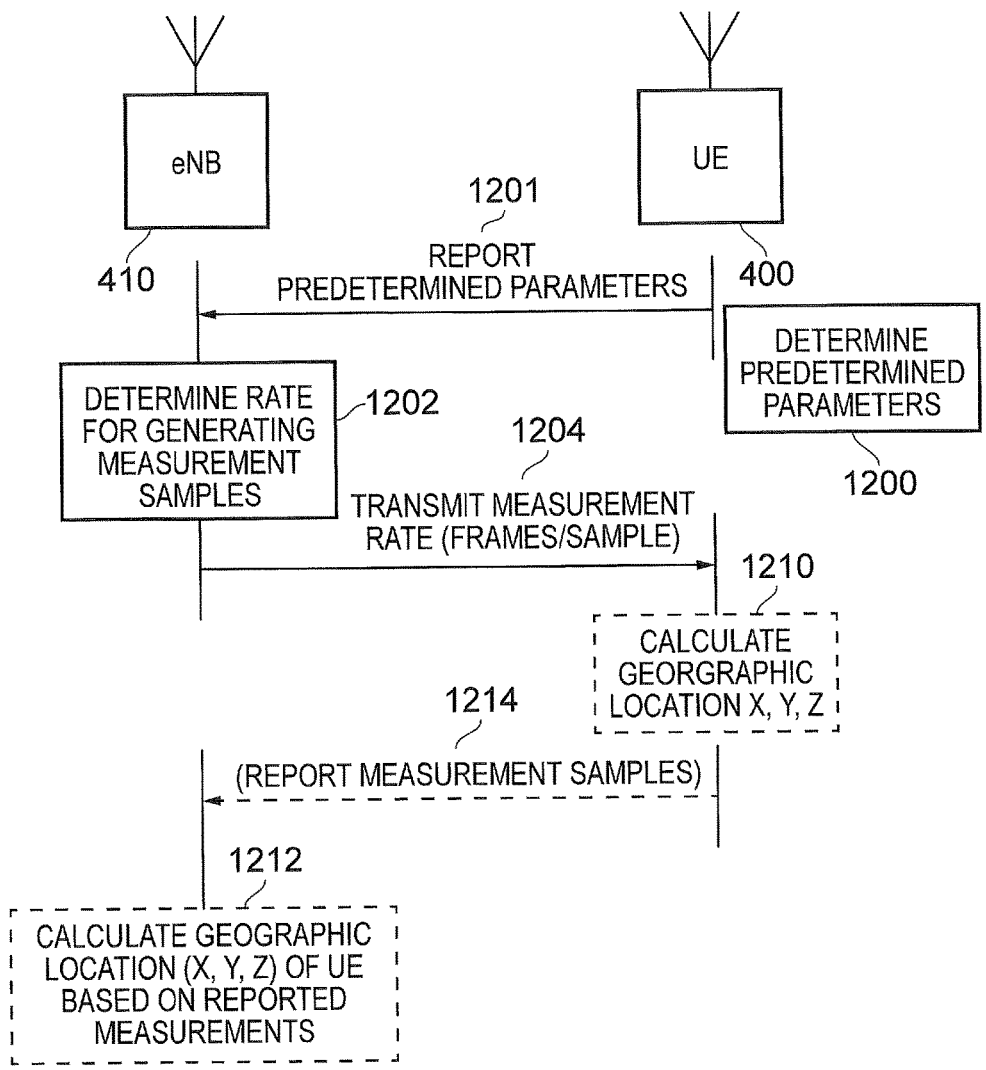
FIG. 12 is a part flow diagram, part message exchange diagram illustrating an example of a process in which a communications device determines its location, or an infrastructure equipment determines the location of the communications device based on an angle of arrival of signals received from the infrastructure equipment by the communications device and a rate of measuring the positioning reference signals determined by the infrastructure equipment in accordance with predetermined parameters.
Figure 13:
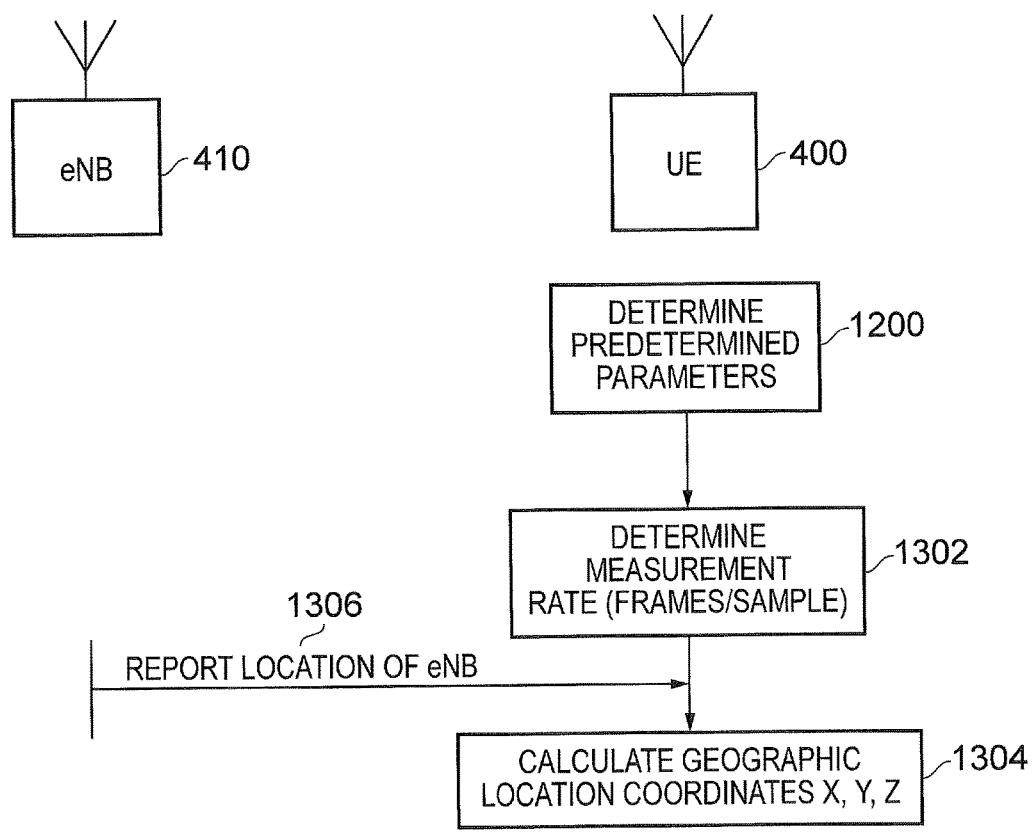
FIG. 13 is a part flow diagram, part message exchange diagram illustrating an example of a process in which a communications device determines its location, based on an angle of arrival of signals received from the infrastructure equipment by the communications device and a rate of measuring the positioning reference signals determined by the communications device in accordance with predetermined parameters.
Figure 14:
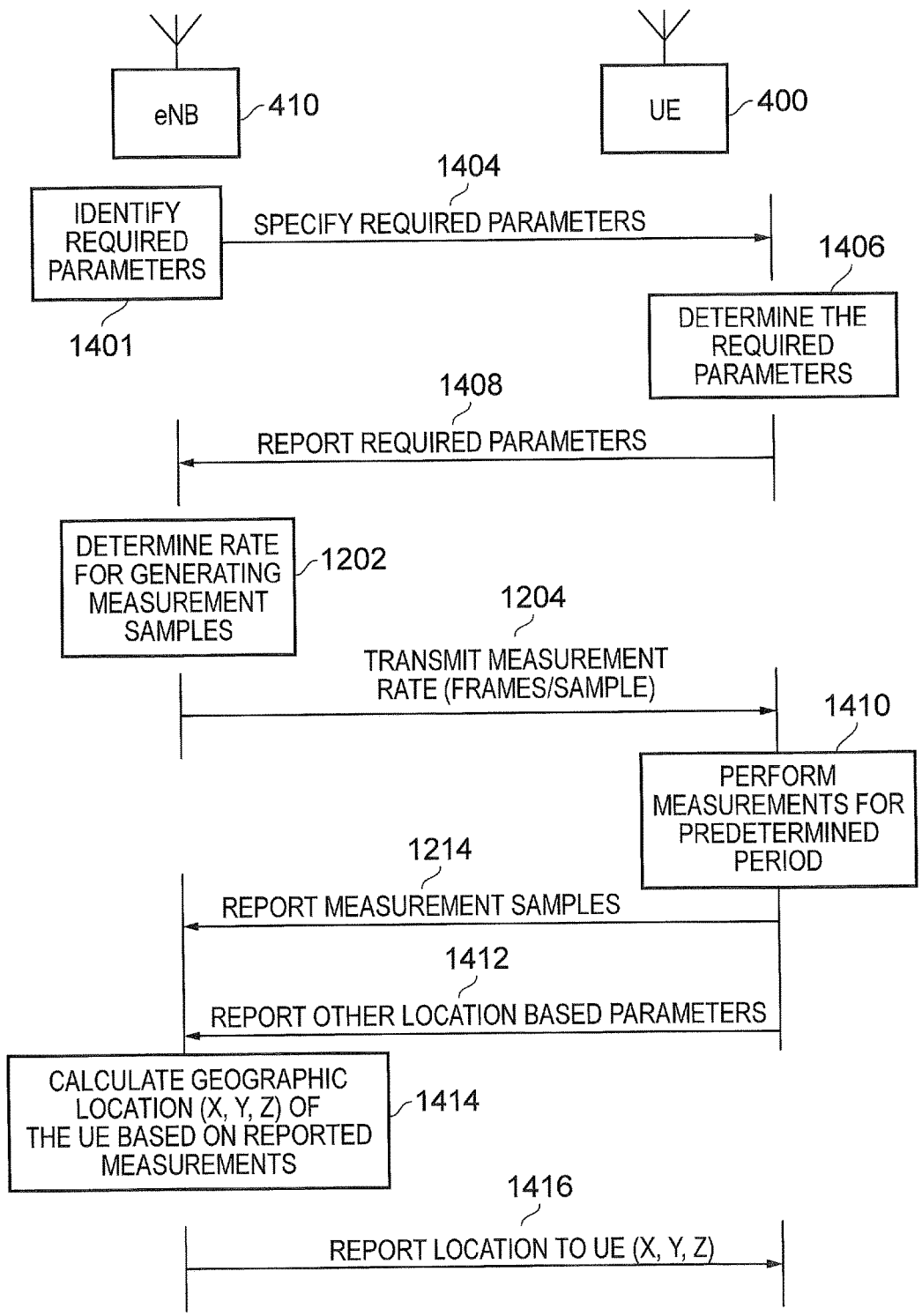
FIG. 14 is a part flow diagram, part message exchange diagram illustrating an example of a process in which an infrastructure equipment determines a location of a communications device based on an angle of arrival of signals received from the infrastructure equipment by the communications device and a rate of measuring the positioning reference signals determined by the infrastructure equipment in accordance with predetermined parameters.

As will be appreciated the calculation of the angle arrival of the signals transmitted by the eNB 410 at the UE 400 can be performed either within the UE 400 or in the eNB 410 or a combination of the UE 400 and the eNB 410. Therefore in one example the eNB 410 would receive the measurement data samples of the synthetic array as explained above and perform the calculation within the eNB. As an alternative example, the UE 400 may retain the measurement data samples of the synthetic array in order to calculate itself the angle arrival of the signals from the eNB 410. In either case and since the measurement data must be performed by the UE 400, the eNB 410 may instruct the UE 400 to generate the measurement data samples at different rates according to the transmitted positioning reference signals within each frame. As a further alternative the UE could itself determine a relative rate of sampling to generate the measurement data samples for the synthetic array based on its relative speed, which are then reported with the measurement data to the eNB 410. Alternatively, the UE would retain the measurement data and receive coordinates identifying the location of the eNB 410 in order to calculate the relative angle of arrival, which can be used to determine the position of the UE 400. Therefore there are various combinations of arrangement for calculating or using measurement data performed by the UE of the positioning reference signals between the UE 400 and the eNB 410. FIGS. 12, 13 and 14 therefore provide different examples of generating the measurement data at the UE under the control of the eNB or without the control of the eNB.

FIG. 12 provides an example in which eNB 410 determines the rate at which the UE 400 should generate measurement data samples for forming the synthetic array. As shown in FIG. 12, the UE 400 first transmits in a message 1201 a report of predetermined or required parameters on which the relative rate of sampling depends. The required parameters could be for example a relative speed of the UE, a relative accuracy of the motion detector, such as for example the gyroscope, or other parameters such as whether UE currently has a pre-established estimate of its location or whether it includes a GPS receiver. For example the GPS receiver may have generated an estimate of its location but may have currently lost contact with the satellites as shown for example for the indoor scenario showing in FIG. 4.

The eNB 410 in a process step 1202 determines a relative rate of sampling of the measurement data to form the set of samples for synthesising the antenna array. The determined rate of transmission is then transmitted in the message 1204 to the UE 400.

Optionally the geographic location is determined using a direction of a direction of angle of arrival calculated from the samples of measurement data forming the synthetic array can then be calculated either in the UE 400 or the eNB 410. Accordingly, in a process step 1210 the UE calculates the geographic location. Alternatively in process step 1212 the eNB calculates the geographic location based on reported measurements. The measurements samples are reported by the UE to the eNB in a message 1214.

In FIG. 13 the corresponding steps shown in FIG. 12 are performed. However, these steps are now performed at the UE so that the UE no longer has to report the predetermined parameters to the eNB or the determined measurement rate. Accordingly, in FIG. 13 in step 1200 the UE determines the predetermined required parameters such as the speed of the UE or a relative quality of the motion detector. In step 1202 the UE again itself calculates the most appropriate measurement rate as in measurement samples for each of a number of frames. From these measurement samples, as explained above, the synthetic array is formed for which the angle of arrival of the signals from the eNB 410 can be determined.

In some examples, as it is necessary, the eNB may report its location, in a form of its geographic co-ordinates X, Y, Z to the UE 400. The UE then can calculate as appropriate the geographic location of itself using the synthetic array and/or other measurement information such as an angle arrival of signals from another eNB such as that shown in FIG. 6. According to this arrangement the UE 400 receives a location from each of the other eNB's and for which the UE performs measurements of signals received from those eNB's in order to calculate an angle of arrival of those signals. Accordingly, the UE can build up a further indication of the location of the UE based on a triangulation of the direction of the arrival of the signals from each of the eNB's.

A further example illustration of an arrangement in which the UE 400 generates measurement samples of position reference signals under the control of an eNB 410 is shown in FIG. 14. In FIG. 14 the controller 408 within the eNB 410 first specifies parameters which are required in order to determine the sampling rate of the measurement samples. The eNB 410 then identifies the specified required parameters and informs the UE of these required parameters by a message 1404. The eNB 410 then determines the required parameters in a step 1406. The UE then reports the measured required parameters in a message 1408 to the UE 410. The eNB then determines a rate for generating the measurement samples performing the synthetic array which is the same as step 1202 showing in FIG. 12 and so has the same reference 1202. Correspondingly, therefore the eNB 410 transmits the measurement rate in message 1204 to the UE 400. The UE 400 then performs the measurements at the instructed measurement rate for a predetermined period in step 1410. The UE then reports the measurement samples in a message 1204 which corresponds to 1204 shown in FIG. 12. The UE may report other location based parameters such as measurement samples from other base stations, to determine an angle of arrival of signals from those base stations, a speed of motion of the UE or a time of flight of signals from the eNB to the UE from which a relative distance of the UE can be determined with respect to the eNB 410. These measurements parameters are reported in message 1412 to the eNB 410. In a step 1414 the eNB may then calculate the geographic location of the UE based on the reported measurements and reports the location of the UE in a message 1416 to the UE.

Accordingly embodiments of the present technique can provide an arrangement in which a communications device is configured to adapt a rate of generating the measurement data set for forming a synthetic antenna array, from which an angle of arrival of radio signals can be estimated, the radio signals including positioning reference signals. The rate of generating the measurement data can be adapted in accordance with predetermined parameters, such as for example, one or more of a speed of the communications device, an accuracy of the motion detector or a frequency of transmission of the radio signals. Other required parameters for determining the sampling rate of the positioning reference signals might include a carrier frequency of the wireless access interface, or a distance from the source of the positioning reference signals, which is the transmitting eNB, an accuracy of the local positioning unit, how and when the reference signal is sent.

Annex 1:

The simplified structure of the downlink of an LTE wireless access interface presented in FIG. 2, also includes an illustration of each subframe 201, which comprises a control region 205 for the transmission of control data, a data region 206 for the transmission of user data , reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink shared channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH. Each uplink subframe may include a plurality of different channels, for example a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNode B. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data , at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

Various further aspects and features of example embodiments are defined in the following numbered paragraphs:

Paragraphs: 1. A communications device configured to transmit signals to and/or receive signals from an infrastructure equipment of a mobile communications network, the communications device comprising
    a receiver configured to receive signals transmitted by an infrastructure equipment of a mobile communications network, the signals being transmitted in accordance with a wireless access interface and including at least one positioning reference signal transmitted in each of a plurality of time units,
    at least one antenna configured to be connected to the receiver,
    a motion detector configured to determine a relative local position of the communications device, and
    a controller configured to generate a measurement data set comprising a plurality of measurement samples of at least a phase of the positioning reference signal according to a sampling rate, and a relative local position of the communications device at which the phase of the positioning reference signal was determined,
    to estimate a relative angle of arrival of the received radio signals, which include the positioning reference signal, by interpreting the measurement data set as a synthetic antenna array,
    to determine an estimation of a location of the communications device using the estimate angle of arrival, wherein the controller is configured to adapt at the rate of sampling to generate the measurement data set in accordance with predetermined conditions.

Paragraphs: 2. A communications device according to paragraph 1, wherein the rate of sampling to generate the measurement data set is determined with respect to a number of time units of the wireless access interval per measurement sample, the positioning reference signals being transmitted at least once per time unit.

Paragraphs: 3. A communications device according to paragraph 1 or 2, wherein the motion detector is configured to generate an estimate of a speed of the communications device, and the predetermined conditions include a speed of the communications device, the controller being configured to adapt the measurement sampling rate in accordance with a relative speed of the communications device.

Paragraphs: 4. A communications device according to paragraph 1, 2 or 3, wherein the motion detector is one of a plurality of different types, each type having a relative accuracy, and the predetermined conditions includes the type of the motion detector, the measurement sampling rate being adapted in accordance with the relative accuracy of the motion detector.

Paragraphs: 5. A communications device according to any of paragraphs 1 to 4, wherein one or more of the predetermined conditions are reported to the infrastructure equipment and in response the controller receives an indication of the measurement sampling rate which should be used.

Paragraphs: 6. A communications device according to any of paragraphs 1 to 5, wherein the controller is configured to control the receiver to receive an indication of a location of the infrastructure equipment as global positioning coordinates, and to use the global positioning coordinates to identify the location of the communications device.

Paragraphs: 7. A method of estimating a location of a communications device configured to transmit signals to and/or receive signals from an infrastructure equipment of a mobile communications network, the method comprising
    receiving signals, using at least one antenna, transmitted from the infrastructure equipment of a mobile communications network, the signals being transmitted in accordance with a wireless access interface and including at least one positioning reference signal transmitted in each of a plurality of time units,
    determining a relative local position of the communications device using a motion detector,
    generating a measurement data set comprising a plurality of measurement samples of at least a phase of the positioning reference signal according to a sampling rate, and a location of the communications device at which the phase of the positioning reference signal was determined, estimating a relative angle of arrival of the received radio signals, which include the positioning reference signal, by interpreting the measurement data set as a synthetic antenna array, determining an estimation of a location of the communications device using the estimate angle of arrival, and adapting the rate of sampling to generate the measurement data set in accordance with predetermined conditions.

Paragraphs: 8. A method according to paragraph 7, wherein the rate of sampling to generate the measurement data set is determined with respect to a number of time units of the wireless access interval per measurement sample, the positioning reference signals being transmitted at least once per time unit.

Paragraphs: 9. A method according to paragraph 7 or 8, wherein the predetermined conditions include a speed of the communications device, and the method comprises generating an estimate of a speed of the communications device, and, the adapting the rate of sampling to generate the measurement data set comprises adapting the measurement sampling rate in accordance with a relative speed of the communications device.

Paragraphs: 10. A method according to paragraph 7, 8 or 9, wherein the motion detector is one of a plurality of different types, each type having a relative accuracy, and the predetermined conditions includes the type of the motion detector, and the adapting the rate of sampling to generate the measurement data set comprises adapting the measurement sampling rate in accordance with the relative accuracy of the motion detector.

Paragraphs: 11. A method according to any of paragraphs 7 to 10, comprising reporting the predetermined conditions to the infrastructure equipment, and in response receiving an indication of the measurement sampling rate, from the infrastructure equipment which should be used.

Paragraphs: 12. A method according to any of paragraphs 7 to 11, comprising receiving an indication of a location of the infrastructure equipment as global positioning coordinates, and using the global positioning coordinates to identify the location of the communications device.

Paragraphs: 13. An infrastructure equipment forming part of a communications network, the infrastructure equipment comprising a transmitter configured to transmit signals in accordance with a wireless access interface to a communications device, the transmitted signals including at least one positioning reference signal transmitted in each of a plurality of time units, a receiver configured to receive signals in accordance with the wireless access interface from the communications device, the received signals representing an indication of values of predetermined parameters for controlling a rate of sampling the positioning reference signals received at the communications device to form a measurement data set which in combination with a relative location of the communications device can be used to generate a synthetic array for detecting an angle of arrival of the signals, and a controller configured to generate an indication of the rate of sampling the received positioning reference signals to generate the measurement data set, based on the received values of the predetermined conditions, and to transmit the generated rate of sampling of the received positioning reference signals to the communications device, the rate of sampling being adapted in accordance with the predetermined conditions.

Paragraphs: 14. An infrastructure equipment according to paragraph 13, wherein the rate of sampling to generate the measurement data set is determined with respect to a number of time units of the wireless access interface per measurement sample, the positioning reference signals being transmitted at least once per time unit.

Paragraphs: 15. An infrastructure equipment according to paragraph 13 or 14, wherein the predetermined conditions include a speed of the communications device, the controller being configured to generate the indication of the measurement sampling rate transmitted to the communications device in accordance with the value indicating the relative speed of the communications device, which is received from the communications device.

Paragraphs: 16. An infrastructure equipment according to paragraph 13, 14 or 15, wherein the communications device includes a motion detector, which is one of a plurality of different types, each type having a relative accuracy, and the predetermined conditions includes the type of the motion detector, the controller being configured to generate the indication of the measurement sampling rate transmitted to the communications device in accordance with the value indicating the relative accuracy of the motion detector used by the communications device, which is received from the communications device.

Paragraphs: 17. An infrastructure equipment according to any of paragraphs 13 to 16, wherein the controller is configured in combination with the transmitter to transmit a indication of global coordinates representing a location of the infrastructure equipment to the communications device.

REFERENCES

[1] LTE for UMTS: OFDMA and SC-FDMA Based Radio Access, Harris Holma and Antti Toskala, Wiley 2009, ISBN 978-0-470-99401-6.

[2] WO2011/146011

What is claimed is:

1. A communications device configured to transmit signals to and/or receive signals from an infrastructure equipment of a mobile communications network, the communications device comprising a receiver configured to receive signals transmitted by an infrastructure equipment of a mobile communications network, the signals being transmitted in accordance with a wireless access interface and including at least one positioning reference signal transmitted in each of a plurality of time units, at least one antenna configured to be connected to the receiver, a motion detector configured to determine a relative local position of the communications device, and a controller configured to generate a measurement data set comprising a plurality of measurement samples of at least a phase of the positioning reference signal according to a sampling rate, and a relative local position of the communications device at which the phase of the positioning reference signal was determined, to estimate a relative angle of arrival of the received radio signals, which include the positioning reference signal, by interpreting the measurement data set as a synthetic antenna array,
to determine an estimation of a location of the communications device using the estimate angle of arrival, wherein the controller is configured to adapt at the rate of sampling to generate the measurement data set in accordance with predetermined conditions,
wherein the motion detector is one of a plurality of different types each type having a relative accuracy, and the predetermined conditions includes the type of the motion detector, the measurement sampling rate being adapted in accordance with the relative accuracy of the motion detector.

2. A communications device as claimed in claim 1, wherein the rate of sampling to generate the measurement data set is determined with respect to a number of time units of the wireless access interval per measurement sample, the positioning reference signals being transmitted at least once per time unit.

3. A communications device as claimed in claim 1, wherein the motion detector is configured to generate an estimate of a speed of the communications device, and the predetermined conditions include a speed of the communications device, the controller being configured to adapt the measurement sampling rate in accordance with a relative speed of the communications device.

4. A communications device configured to transmit signals to and/or receive signals from an infrastructure equipment of a mobile communications network, the communications device comprising
a receiver configured to receive signals transmitted by an infrastructure equipment of a mobile communications network, the signals being transmitted in accordance with a wireless access interface and including at least one positioning reference signal transmitted in each of a plurality of time units,
at least one antenna configured to be connected to the receiver,
a motion detector figured to determine a relative local position of the communications device, and
a controller configured to generate a measurement data set comprising a plurality of measurement samples of at least a phase of the positioning reference signal according to a sampling rate, and a relative local position of the communications device at which the phase of the positioning reference signal was determined,
to estimate a relative angle of arrival of the received radio signals, which include the positioning reference signal, by interpreting the measurement data set as a synthetic antenna array,
to determine an estimation of a location of the communications device using the estimate angle of arrival, wherein the controller is configured to adapt at the rate of sampling to generate the measurement data set in accordance with predetermined conditions,
wherein one or more of the predetermined conditions are reported to the infrastructure equipment and in response the controller receives an indication of the measurement sampling rate which should be used.

5. A communications device as claimed in claim 1, wherein the controller is configured to control the receiver to receive an indication of a location of the infrastructure equipment as global positioning coordinates, and to use the global positioning coordinates to identify the location of the communications device.

6. A method of estimating a location of a communications device configured to transmit signals to and/or receive signals from an infrastructure equipment of a mobile communications network, the method comprising
receiving signals, using at least one antenna, transmitted from the infrastructure equipment of a mobile communications network, the signals being transmitted in accordance with a wireless access interface and including at least one positioning reference signal transmitted in each of a plurality of time units,
determining a relative local position of the communications device using a motion detector,
generating a measurement data set comprising a plurality of measurement samples of at least a phase of the positioning reference signal according to a sampling rate, and a location of the communications device at which the phase of the positioning reference signal was determined,
estimating a relative angle of arrival of the received radio signals, which include the positioning reference signal, by interpreting the measurement data set as a synthetic antenna array,
determining an estimation of a location of the communications device using the estimate angle of arrival, and
adapting the rate of sampling to generate the measurement data set in accordance with predetermined conditions,
wherein the motion detector is one of a plurality of different types, each type having a relative accuracy, and the predetermined conditions includes the type of the motion detector, and the adapting the rate of sampling to generate the measurement data set comprises adapting the measurement sampling rate in accordance with the relative accuracy of the motion detector.

7. A method as claimed in claim 6, wherein the rate of sampling to generate the measurement data set is determined with respect to a number of time units of the wireless access interval per measurement sample, the positioning reference signals being transmitted at least once per time unit.

8. A method as claimed in claim 6, wherein the predetermined conditions include a speed of the communications device, and the method comprises
generating an estimate of a speed of the communications device, and, the adapting the rate of sampling to generate the measurement data set comprises
adapting the measurement sampling rate in accordance with a relative speed of the communications device.

9. A method of estimating a location of a communications device configured to transmit signals to and/or receive signals from an infrastructure equipment of a mobile communications network, the method comprising
receiving signals, using at least one antenna, transmitted from the infrastructure equipment of a mobile communications network, the signals being transmitted in accordance with a wireless access interface and including at least one positioning reference signal transmitted in each of a plurality of time units,
determining a relative local position of the communications device using a motion detector,
generating a measurement data set comprising a plurality of measurement samples of at least a phase of the positioning reference signal according to a sampling rate, and a location of the communications device at which the phase of the positioning reference signal was determined, estimating a relative angle of arrival of the received radio signals, which include the positioning reference signal, by interpreting the measurement data set as a synthetic antenna array, determining an estimation of a location of the communications device using the estimate angle of arrival, adapting the rate of sampling to generate the measurement data set in accordance with predetermined conditions, reporting the predetermined conditions to the infrastructure equipment, and in response receiving an indication of the measurement sampling rate, from the infrastructure equipment which should be used.

10. A method as claimed in claim 6, comprising receiving an indication of a location of the infrastructure equipment as global positioning coordinates, and using the global positioning coordinates to identify the location of the communication device.

11. An infrastructure equipment forming part of a communications network, the infrastructure equipment comprising a transmitter configured to transmit signals in accordance with a wireless access interface to a communications device, the transmitted signals including at least one positioning reference signal transmitted in each of a plurality of time units, a receiver configured to receive signals in accordance with the wireless access interface from the communications device, the received signals representing an indication of values of predetermined parameters for controlling a rate of sampling the positioning reference signals received at the communications device to form a measurement data set which in combination with a relative location of the communications device can be used to generate a synthetic array for detecting an angle of arrival of the signals, and a controller configured to generate an indication of the rate of sampling the received positioning reference signals to generate the measurement data set, based on the received values of the, predetermined conditions, and to transmit the generated rate of sampling of the received positioning reference signals to the communications device, the rate of sampling being adapted in accordance with the predetermined conditions.

12. An infrastructure equipment as claimed in claim 11, wherein the rate of sampling to generate the measurement data set is determined with respect to a number of time units of the wireless access interface per measurement sample, the positioning reference signals being transmitted at least once per time unit.

13. An infrastructure equipment as claimed in claim 11, wherein the predetermined conditions include a speed of the communications device, the controller being configured to generate the indication of the measurement sampling rate transmitted to the communications device in accordance with the value indicating the relative speed of the communications device, which is received from the communications device.

14. An infrastructure equipment as claimed in claim 11, wherein the communications device includes a motion detector, which is one of a plurality of different types, each type having a relative accuracy, and the predetermined conditions includes the type of the motion detector, the controller being configured to generate the indication of the measurement sampling rate transmitted to the communications device in accordance with the value indicating the relative accuracy of the motion detector used by the communications device, which is received from the communications device.

15. An infrastructure equipment as claimed in claim 11, wherein the controller is configured in combination with the transmitter to transmit a indication of global coordinates representing a location of the infrastructure equipment to the communications device.

16. A method of assisting a communications device to estimate a location of the communications device, the method comprising transmitting signals in accordance with a wireless access interface to a communications device, the transmitted signals including at least one positioning reference signal transmitted in each of a plurality of time units, receiving signals in accordance with the wireless access interface from the communications device, the received signals representing an indication of values of predetermined parameters for controlling a rate of sampling the positioning reference signals received at the communications device to form a measurement data set which in combination with a relative location of the communications device can he used to generate a synthetic array for detecting an angle of arrival of the signals, and generating an indication of the rate of sampling the received positioning reference signals to generate the measurement data set, based on the received values of the predetermined conditions, and transmitting the generated rate of sampling of the received positioning reference signals to the communications device, the rate of sampling being adapted in accordance with the predetermined conditions.

* * * * *